(12) United States Patent
Burke et al.

(10) Patent No.: US 7,701,602 B2
(45) Date of Patent: Apr. 20, 2010

(54) MOBILE DEVICE-BASED PRINTING SYSTEM AND METHOD

(75) Inventors: Paul Michael Burke, Bedford, NH (US); Scott McGlashan, Kista (SE)

(73) Assignee: Hewlett-Packard Development Company, L.P., Houston, TX (US)

( * ) Notice: Subject to any disclaimer, the term of this patent is extended or adjusted under 35 U.S.C. 154(b) by 1471 days.

(21) Appl. No.: 11/053,864

(22) Filed: Feb. 10, 2005

(65) Prior Publication Data

US 2006/0176504 A1    Aug. 10, 2006

(51) Int. Cl.
H04L 29/00 (2006.01)
G06K 15/00 (2006.01)
G06F 3/12 (2006.01)

(52) U.S. Cl. .................. 358/1.15; 726/3; 710/20
(58) Field of Classification Search ............ 358/1.15; 726/3; 710/20
See application file for complete search history.

(56) References Cited

U.S. PATENT DOCUMENTS

2003/0069921 A1* 4/2003 Lamming et al. ........... 709/203
2004/0143566 A1* 7/2004 Fukasawa .................. 707/1
2004/0185882 A1   9/2004 Gecht et al.
2006/0206390 A1* 9/2006 Asano ....................... 705/26

FOREIGN PATENT DOCUMENTS

WO    WO 2004/079562    9/2004

* cited by examiner

Primary Examiner—Chan S Park (57) ABSTRACT

A mobile device-based printing system and method is described. The printer system for network printing includes a communication network adapted to transfer messages between a mobile device and a printer. The printer is connectable to the communication network to receive a print message, including a reference to a document to be printed, via the communication network. The printer has a phone number for receiving print messages via said communication network. The mobile device is connectable to the communication network to transmit the print message on the communication network. A method for printing from a mobile device to a printer using a communication network includes transmitting a print message to a phone number of the printer from the mobile device where the print message includes a reference to a document to be printed.

19 Claims, 6 Drawing Sheets

MOBILE DEVICE-BASED PRINTING SYSTEM AND METHOD

FIELD OF THE INVENTION

The present invention relates to a system for printing from a mobile device to a printer and a corresponding method thereof.

BACKGROUND

It is known in the art to use a printer connected to a computer system to print documents and to connect a portable hand-held device to a printer to print documents.

Printing from phones typically requires a smartphone, i.e., a device resulting from the combination of a cellular telephone and a personal digital assistant, class of phone facilitating the print formatting and print driver. This requires special applications loaded into the phone in order to print on the printer. Additionally, phones require either wired connections, e.g., USB, serial, or parallel, etc., or wireless connections, e.g., infrared or Bluetooth, etc. Problematically, not all phones are smartphones having IR or Bluetooth connectivity capability.

A network printer in a public location, such as a print kiosk in a shopping mall, typically includes an IP address identifying the printer on the network. However, the network address, e.g., formatted as a period separated sequence of numbers such as 192.167.1.1 using Internet Protocol (IP) version 4 addressing and as a colon separated sequence of numbers typically including eight groups of 4 hexadecimal digits, such as 3ffe:6a88:85a3:08d3:1319:8a2e:0370:7344, is not conducive to entry using a typical mobile device as neither a colon nor a period are typically found on telephone keypads.

Additionally problematic, printer software appropriate for the network printer must be installed in the mobile device in order to enable printing from the mobile device to the printer.

SUMMARY

The present invention provides a mobile device-based printing system and method.

An apparatus aspect includes a communication network for transferring messages between a mobile device and a printer, each connectable to the communication network. The mobile device transmits a print message, including a reference to a document to be printed, on the communication network. The printer has a phone number for receiving print messages via the communication network. The printer receives the print message via the communication network.

A method aspect for printing from a mobile device to a printer using a communication network includes transmitting a print message to a phone number of the printer from the mobile device where the print message includes a reference to a document to be printed.

A networked printer aspect includes a network printer having a phone number. The printer includes a print engine for printing, a message handling processor for: receiving a print message, and a communication interface adapted for receiving a print message transmitted to the network printer phone number and transmitting the print message to the message handling processor. The print message includes a reference to a document to be printed on the print engine and the message handler is adapted to retrieve the referenced document, and transmit the referenced document to the print engine to be printed.

Still other advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

In contrast with the above-described approaches, a mechanism according to an embodiment of the present invention enables printing from a mobile device to a networkable printer.

Figure 1:
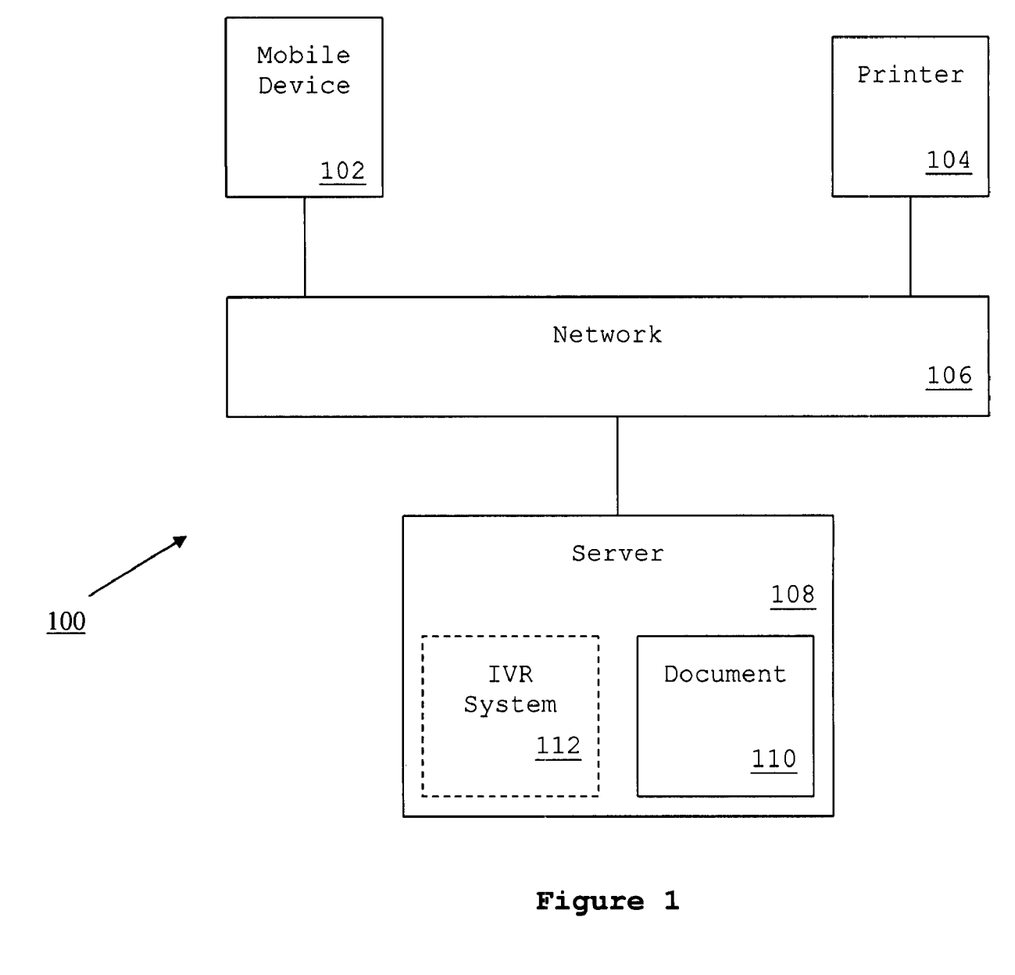
FIG. 1 is a high level block diagram of a system usable in conjunction with an embodiment according to the present invention.
Figure 4:
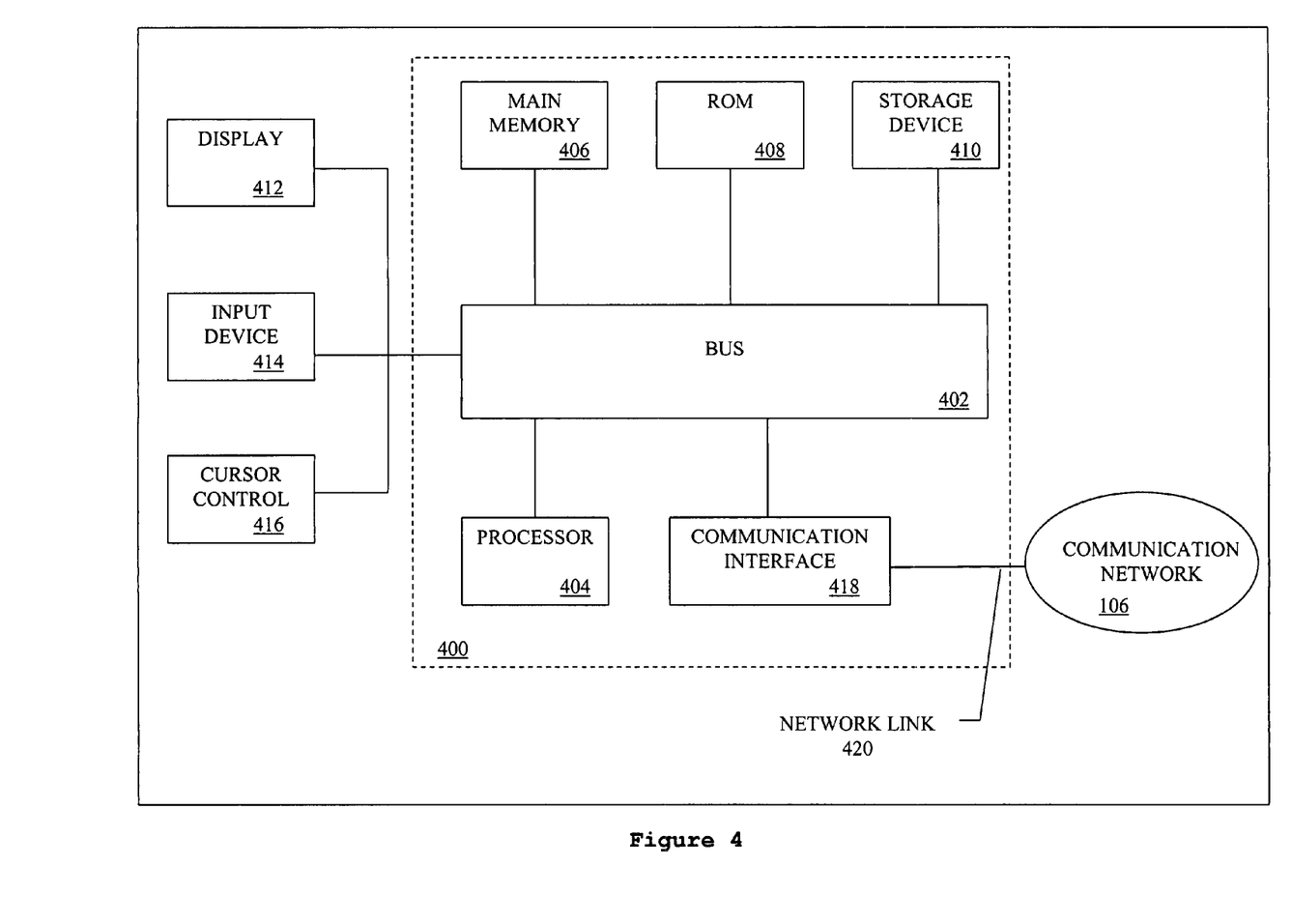
FIG. 4 is a high level block diagram of a computer system usable in conjunction with an embodiment.

In a first embodiment of a network printing system 100 according to the present invention as depicted in FIG. 1, a mobile device 102, e.g., a mobile telephone, phone-based personal digital assistant, or other similar device, connects to a communication network 106, e.g., a telecommunication network such as a cellular telephone network. A printer 104, e.g., an inkjet printer, laser printer, or other similar device, having a communication ability (as described below with reference to FIG. 5) is connected with communication network 106. Further, a server 108, e.g., a computer system (described below in conjunction with FIG. 4), or other similar device, connects to communication network 106 and stores a document 110 in memory 406 or storage device 410 (FIG. 4). It is to be understood that more than one mobile device 102, printer 104, server 108, and network 106 may be interconnected; however, for clarity only one of each element is described.

A phone number is assigned to both mobile device 102 and printer 104 enabling communication network 106 to transfer communication between the mobile device and the printer. Mobile device 102 is configured to enable transmission of messages, e.g., short message service (SMS) messages, to a phone number of communication network 106. Printer 104 is configured to receive messages, e.g., SMS messages, from communication network 106 via a communication interface 500. It is to be understood that different types of message formats and protocols may be used in place of, or in addition to, SMS messages.

Figure 5:
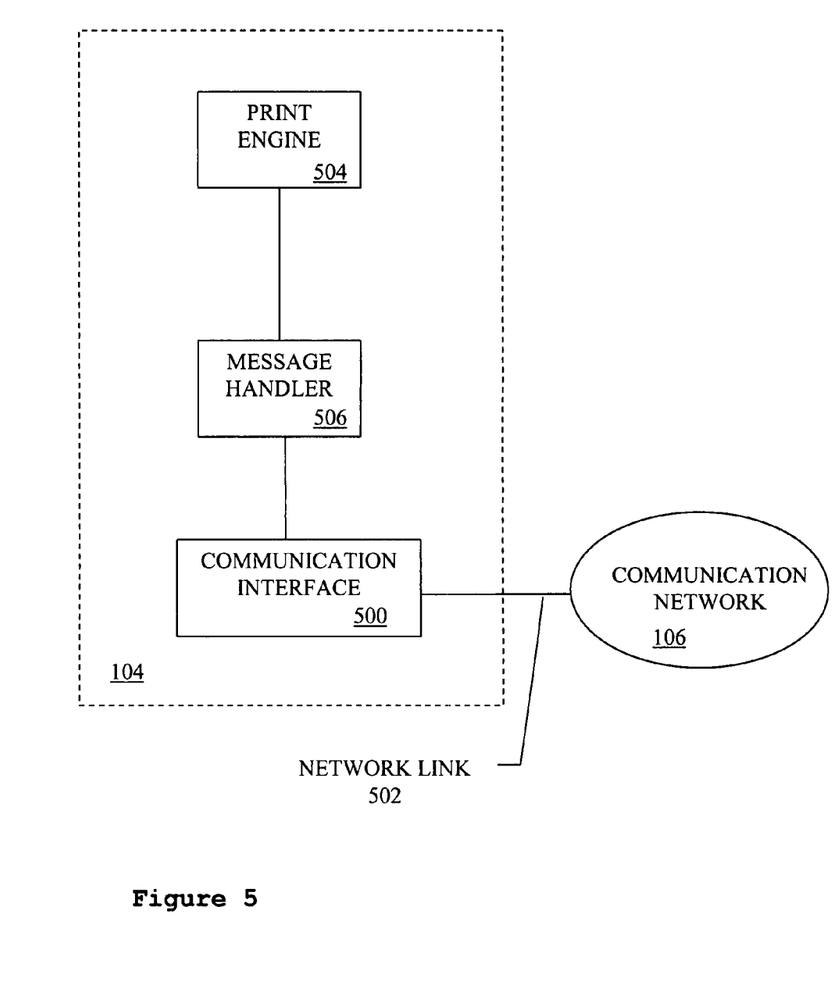
FIG. 5 is a high level block diagram of a networked printer useable in conjunction with an embodiment.

Additionally, printer 104 is configured to transmit request messages, e.g., hypertext transport protocol (HTTP) request messages, file transfer protocol (FTP) messages, etc., and receive reply messages to/from server 108 via communication interface 500 using communication network 106 and network link 502. In this manner, printer 104 is able to request document 110 from server 108 by transmitting a request message to the server and receive the document from the server over communication network 106 and communication interface 502. After receipt of document 110, printer 104 proceeds to format and print the received document as described below.

FIG. 5 is a functional block diagram depicting a portion of networked printer upon which an embodiment may be implemented. Printer 104 includes a print engine 504 for printing, a message handler 506 for receiving and processing print messages received via communication interface 500 from communication network 106, and ultimately from mobile device 102. Communication interface 500 receives print messages having references to documents requested to be printed by print engine 504. Communication interface 500 provides the received print messages to message handler 506.

Message handler 506 receives the print messages from communication interface 500 and processes the print message. Message handler 500 transmits a request message including the reference from the print message via communication interface 500 to server 108 to request document 110. In response, server 108 transmits document 110 to printer 104. Communication interface 500 receives the transmitted document 110 and provides the document to message handler 506. In turn, message handler 506 transmits document 110 to print engine 504 for printing.

Communication interface 500 is able to receive and transmit messages from communication network 106, e.g., print messages, request messages, and reply messages as described above. Message handler 506, software, hardware, firmware, or a combination thereof, receives messages from communication interface 500, processes the received messages, and requests printing by print engine 504.

Server 108, e.g., a web server, a file server, or other similar devices, has a network address, e.g., www.hp.com, 192.168.1.23, etc., accessible via communication network 106. Server 108 stores a document 110, e.g., a word processing document, a spreadsheet, a web page, or other printable file. Server 108 is assigned a network address, e.g., an IP address, a uniform resource location (URL), etc.

In another embodiment, server 108 is assigned a telephone number for communication using communication network 106. Optionally, server 108 includes a voice system 112 (dashed line), e.g., an interactive voice response (IVR) system, for automated interaction with users via communication network 106. According to such a voice system 112, a user using mobile device 102 dials the telephone number assigned to server 108 and interacts with an automated system via voice commands and/or user input via mobile device 102, e.g., keypad input.

Figure 2:
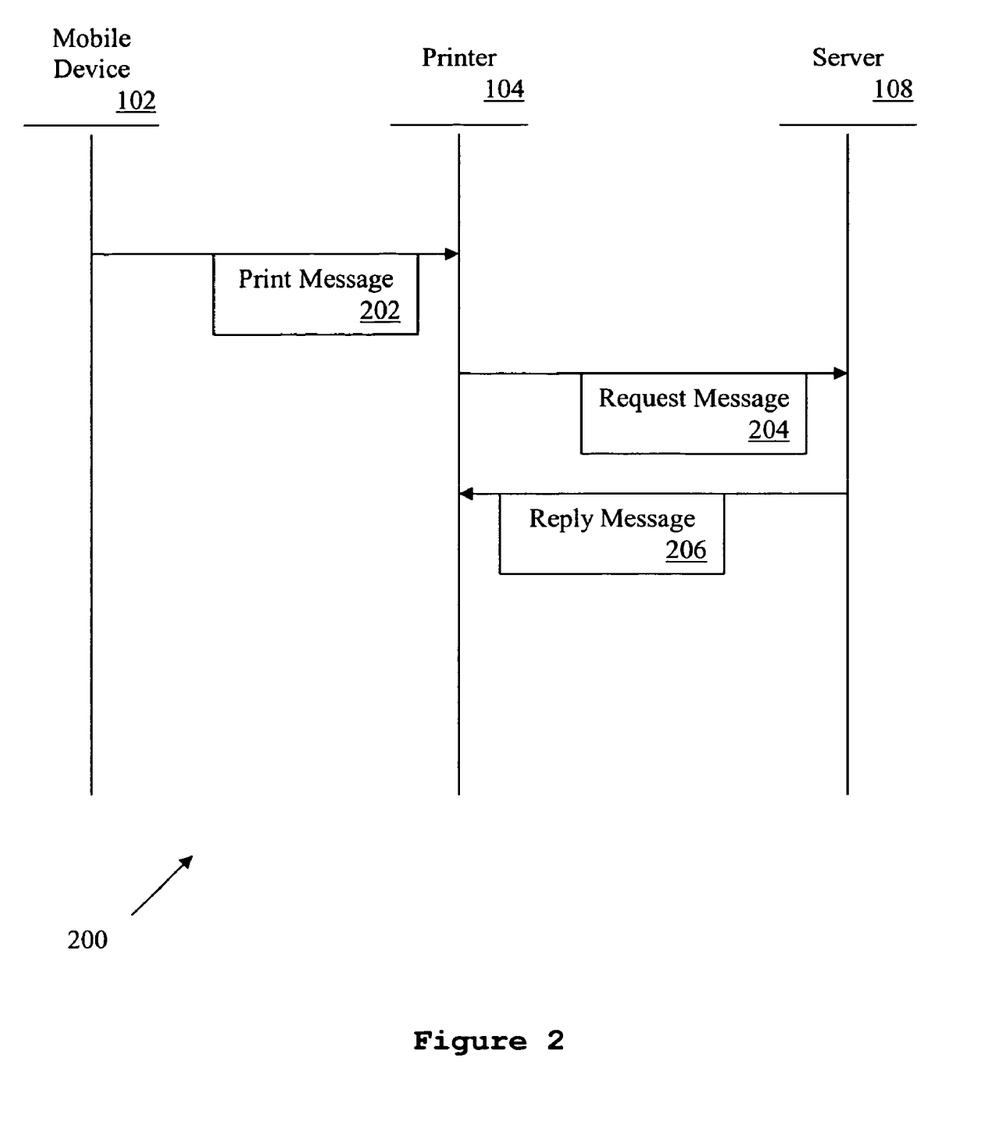
FIG. 2 is an interaction diagram of interactions between components of the system of FIG. 1 according to a first embodiment.

Interaction of the above-described system elements according to a first embodiment are now described with reference to FIG. 2. Events are time ordered and proceed downward along the page of interaction 200.

A user using mobile device 102, connected to communication network 106, causes the mobile device to transmit a print message 202 to printer 104 using the communication network. In an embodiment, print message 202 is an SMS message. Print message 202 includes a reference, e.g., a URL or other indicator, identifying the location of a particular document 110 on server 108, e.g., a particular web page on a web server.

After receipt of print message 202, printer 104 transmits a request message 204 to server 108 using communication network 106. In an embodiment, printer 104 transmits request message 204 over a high bandwidth network connection using a network protocol, e.g., TCP/IP. In another embodiment, printer 104 transmits request message 204 via a low bandwidth network connection, e.g., an SMS message.

Printer 104 transmits request message 204 to server 108 at the destination specified by the reference contained within print message 202 using communication network 106.

In response to receipt of request message 204, server 108 transmits a reply message 206, including the document 110 specified in the request message 204, to printer 104 using communication network 106. After receipt of reply message 206, printer 104 prints document 110. In an embodiment, server 108 transmits reply message 206 to printer 104 using a high bandwidth network connection, i.e., mobile device 102 and printer 104 may use a low bandwidth network connection to transmit print message 202 while server 108 uses a high bandwidth network connection to transmit reply message 206 including document 110 to the printer.

In an embodiment, server 108 transmits a version of document 110 formatted for printing on printer 104. In another embodiment, server 108 transmits an unformatted version of document 110 to printer 104 and the printer formats the document for printing.

Figure 6:
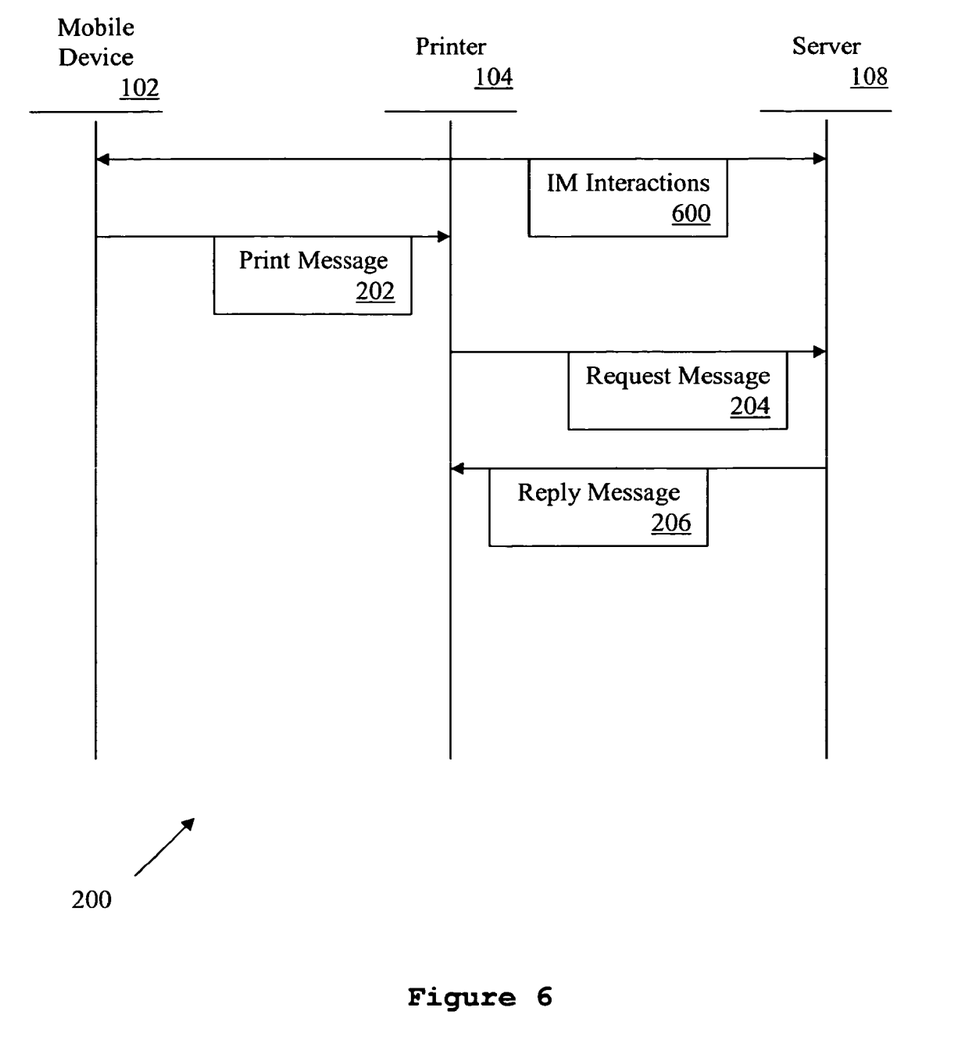
FIG. 6 is an interaction diagram of interactions between components of the system of FIG. 1 according to a variation of the first embodiment.

Interaction of the system elements according to a variation of the first embodiment are now described with reference to FIG. 6 wherein a user of mobile device 102 accesses an integrated messaging (IM) system hosted by server 108 via communication network 106. The IM system enables the user to access messages, e.g., electronic mail, voice mail, etc., using mobile device 102.

During the course of IM interactions 600, the user accesses a message on server 108 and obtains a reference to the message, e.g., a reference in the form of a URL to the message on server 108. The obtained reference is captured at mobile device 102. The remainder of the messaging interactions of FIG. 6 proceed similar to those described above with respect to FIG. 2. Print message 202 transmitted from mobile device 102 to printer 104 includes the reference previously obtained from server 108. Request message 204 transmitted from printer 104 to server 108 includes the previously obtained reference. In reply to request message 204, server 108 transmits the document referenced by the previously obtained reference to printer 104 for printing. For example, the message on the server is obtained and printed by printer 104.

In an embodiment according to the above variation, server 108 is a secure server requiring user authentication prior to transmission of the message to mobile device 102. The reference obtained as a result of IM interactions 600 includes the authentication information provided by the user to server 108 to thereby enable printer 104 to authenticate to server 108 by way of request message 204.

In a further embodiment (not shown), server 108 is located behind a firewall and a user accessing the server using mobile device 102 causes the server to copy a protected, e.g., encrypted, version of the referenced document to a location external to the firewall and accessible by printer 104. The user desiring to print the document on printer 104 uses mobile device 102 to transmit the reference to the external copy of the referenced document including information necessary to obtain and unprotect the referenced document. Printer 104 then proceeds to obtain and print the referenced document similar to the above-described FIG. 2 embodiment using the reference provided by mobile device 102.

Figure 3:
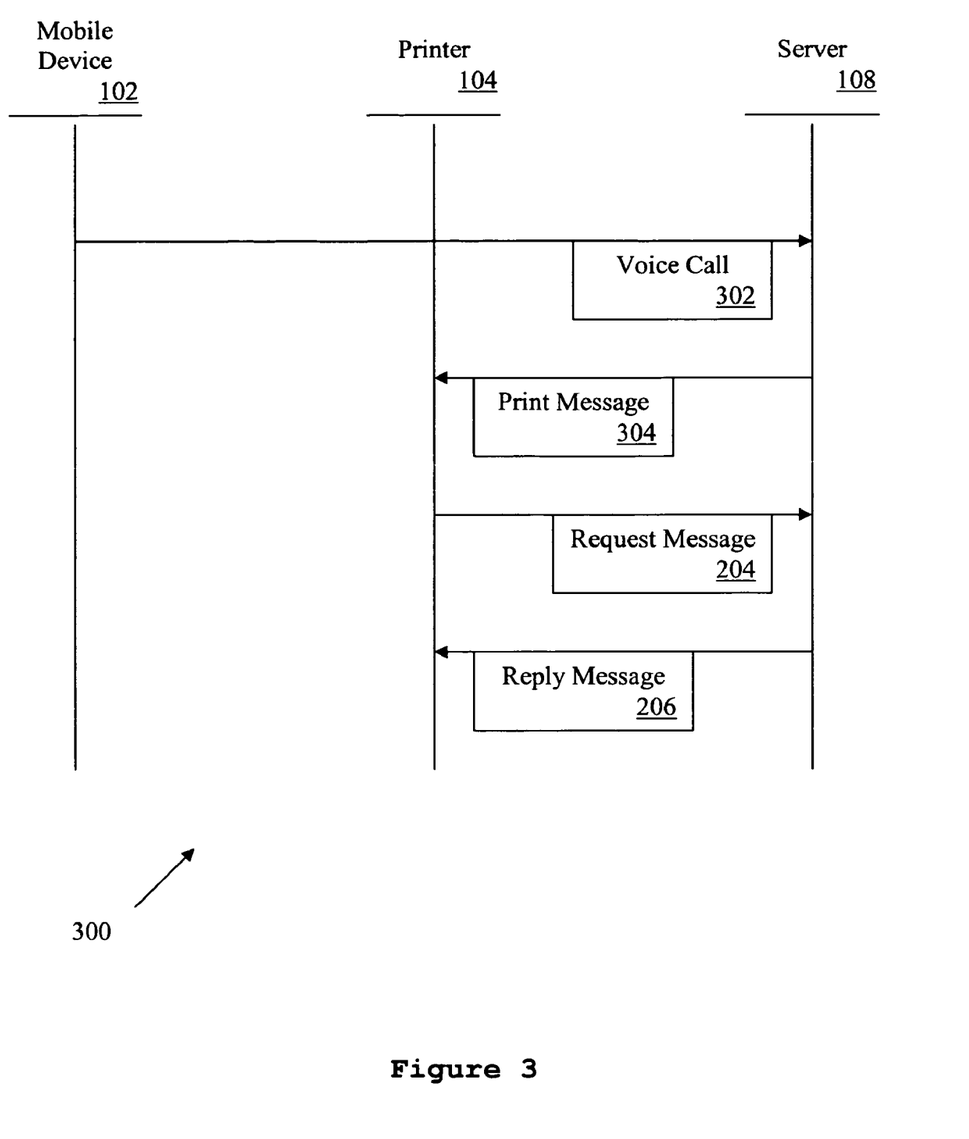
FIG. 3 is an interaction diagram according to a second embodiment.

Interaction of the system elements according to a second embodiment are now described with reference to FIG. 3. Similar to FIG. 2 above, events are time ordered and proceed downward along the page of interaction 300.

A user using mobile device 102, connected to communication network 106, causes the mobile device to connect to server 108 and establish an audio-based communication session between the mobile device and the server. That is, the user uses mobile device 102 to connect to and interact with an interactive voice response (IVR) system 112 (dashed line, FIG. 1) executed by server 108. IVR system 112 receives user input, e.g., in the form of voice commands or keypad input, and responds based on the user input. For example, a user may request information using voice commands and IVR system 112 responds with the requested information, e.g., using prerecorded vocal information or synthesized vocal information. In an embodiment, IVR system 112 using voice synthesis offers print services to a connected user using a mobile device 102, e.g., offers including printing of maps, directions, tickets, restaurant details and menus, etc.

According to the third embodiment, the user using mobile device 102 enters input commands to an IVR system on server 108 during voice call 302. The input commands provide a reference, e.g., to document 110 on server 108, and a destination address identifying the device to which the reference is requested to be directed.

After receipt of the user-input commands at IVR system 112 on server 108, server 108 transmits print message 304 to printer 104 via communication network 106, printer 104 receives print message 304 and transmits request message 204 to server 108, and server 108 receives request message 204 and transmits reply message 206 including document 110 to printer 104 for printing.

In an embodiment, print message 304 includes a destination address, e.g., a phone number, identifying the device to which print message 304 is directed. Server 108 transmits print message 304 to printer 104 at the destination address specified in voice call 302. In this manner, a single server 108 is able to handle multiple print messages from multiple mobile devices to multiple printers at the same time. Printer to destination address mappings may be changed as needed. For example, a queuing system may be utilized for a location having two printers such that a single phone number is usable to print to either of the two printers based on availability.

Printer 104, connected to communication network 106, receives print message 304 and transmits request message 204 to server 108, as described above. Further, as described more fully above, server 108 receives request message 204 and transmits reply message 206 including document 110 to printer 104 for printing. It is to be further understood that document 110 may be located at a different location than server 108, e.g., on a different server or communication network accessible to printer 104.

Using the above-described embodiments according to the present invention, mobile devices, e.g., mobile phones, etc., are able to send text messages to a printer. The text, e.g., SMS, messages may contain pointers in the form of uniform resource locations (URLs) pointing to network-based documents to be printed. For example, in an embodiment, an SMS message includes an Internet web page address.

The use of SMS messages including pointers to network content enables printer 104 to locate documents requested by a user to be printed on the printer. In an alternate embodiment, the pointers are provided by a server 108, e.g., a media server system controlling an interactive voice response system 112 to locate the requested content.

Advantageously, embodiments of the present invention do not require so-called smartphones. Further, direct connectivity between mobile device 102 and printer 104 is not required, e.g., a wired connection, such as serial cable, USB cable, parallel cable, etc., or a wireless connection, e.g., infrared, Bluetooth, or other similar connections. Further still, special printing software or printer drivers need not be installed on mobile device 102 in order for the mobile device to cause a document to be printed on printer 104. Further, still, a server 108 is able to route the print message from mobile device 102 to a printer 104 located adjacent to the mobile device, e.g., based on information received from/about the location of mobile device 102.

FIG. 4 is a block diagram illustrating an exemplary computer system 400 upon which a server 108 may be implemented.

Computer system 400 includes a bus 402 or other communication mechanism for communicating information, and a processor 404 coupled with the bus 402 for processing information. Computer system 400 also includes a main memory 406, such as a random access memory (RAM) or other dynamic storage device, coupled to the bus 402 for storing data, e.g., document 110, and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to the bus 402 for storing static information and instructions for the processor 404. A storage device 410, such as a magnetic disk or optical disk, is provided and coupled to the bus 402 for storing data, and instructions.

Computer system 400 may be coupled via the bus 402 to a display 412, such as a cathode ray tube (CRT) or a flat panel display. An input device 414, including alphanumeric and function keys, is coupled to the bus 402 for communicating information and command selections to the processor 404. Another type of user input device is cursor control 416, such as a mouse, a trackball, or cursor direction keys for communicating direction information and command selections to processor 404 and for controlling cursor movement on the display 412. This input device typically has two degrees of freedom in two axes, a first axis (e.g., x) and a second axis (e.g., y) allowing the device to specify positions in a plane.

According to an embodiment of the invention, computer system 400 responds to input received via communication network 106 from mobile device 102 by processor 404 executing sequences of instructions contained in main memory 406. Such instructions may be read into main memory 406 from another computer-readable medium, such as storage device 410.

However, the computer-readable medium is not limited to devices such as storage device 410. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 406 causes the processor 404 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 400 also includes a communication interface 418 coupled to the bus 402. Communication interface 408 provides two-way data communication, e.g., digital or analog data or voice communication. For example, communication interface 418 may be a cellular communication device, an integrated services digital network (ISDN) card, a digital subscriber line (DSL) card, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals which carry digital data streams representing various types of information. Of particular note, the communications through interface 418 may permit transmission or receipt of print messages, voice calls, request messages, and reply messages. For example, two or more computer systems 400 may be networked together in a conventional manner with each using the communication interface 418.

Network link 420 typically provides data or voice communication through one or more networks to other devices. For example, network link 420 may provide a connection through communication network 106 to mobile device 102 or printer 104. Communication network 106 uses electrical, electromagnetic or optical signals which carry data streams. The signals through the various networks and the signals on network link 420 and through communication interface 418, which carry the data to and from computer system 400, are exemplary forms of carrier waves transporting the information.

Computer system 400 can send messages and receive data, including program code, through the network(s), network link 420 and communication interface 418.

The received code may be executed by processor 404 as it is received, and/or stored in storage device 410, or other non-volatile storage for later execution. In this manner, computer system 400 may obtain application code in the form of a carrier wave.

It will be readily seen by one of ordinary skill in the art that embodiments of the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A printer system for network printing, comprising:
a communication network adapted to transfer messages between a mobile device and a printer;
said printer connectable to said communication network to receive a print message via said communication network, said print message including a reference to a document to be printed by said printer, said printer having a phone number for receiving print messages via said communication network;
said mobile device connectable to said communication network, said mobile device adapted to transmit said print message on said communication network;
wherein said printer is adapted to generate and transmit a request message on said communication network, in response to receiving said print message, to request the document to be printed; and
wherein said request message comprises the received print message reference.

2. The system of claim 1, wherein said print message is a short message service message.

3. The system of claim 1, wherein said mobile device transmits said print message directly to said printer at said printer phone number via said communications network.

4. The system of claim 1, wherein said print message reference is a network address.

5. The system of claim 1, wherein said request message is transmitted to a destination specified in the print message.

6. The system of claim 1, wherein said printer is adapted to receive the document requested in the request message transmitted on said communication network.

7. The system of claim 1, wherein said communication network is one of a high bandwidth network and a low bandwidth network.

8. The system of claim 1, further comprising:
a server connectable to said communication network, said server having an interactive voice response system for receiving user-input commands including said print message, wherein said server is adapted to transmit said print message to said printer in response to the received user-input commands.

9. A method for printing from a mobile device to a printer using a communication network, comprising the steps of:
transmitting a print message to a phone number of the printer from the mobile device, wherein the print message includes a reference to a document to be printed;
generating a request message at the printer in response to receiving the print message, wherein the request message comprises the print message reference to the document to be printed; and
transmitting the request message from the printer using the communication network to request the document to be printed.

10. The method as claimed in claim 9, wherein the print message is a short message service message.

11. The method as claimed in claim 9, wherein the print message is transmitted directly to the printer.

12. The method as claimed in claim 9, wherein the print message reference is a network address.

13. The method as claimed in claim 9, further comprising the steps of:
transmitting the request message from the printer to a destination specified in the print message;
receiving a reply message at the printer, wherein the reply message includes the referenced document to be printed.

14. The method as claimed in claim 13, further comprising the step of:
printing the received referenced document at the printer.

15. The method as claimed in claim 9, wherein the communication network is one of a high bandwidth network and a low bandwidth network.

16. The method as claimed in claim 9, wherein the transmitting step further comprises the step of:
transmitting user-input voice commands including the print message from the mobile device to a server; and
in response to the user-input voice commands, transmitting the print message from the server to the printer.

17. A networked printer having a phone number, comprising:
a print engine for printing;
a message handling processor; and
a communication interface;

wherein the communication interface is adapted for receiving a print message transmitted to the networked printer phone number and transmitting the print message to the message handling processor, the print message having a reference to a document to be printed on the print engine; and wherein the message handling processor is adapted for receiving the print message, generating a request message comprising the print message reference to request the referenced document, retrieving the referenced document from a reply message responsive to the request message, and transmitting the referenced document to the print engine to be printed.

18. The networked printer as claimed in claim 17, wherein the print message is a short message service message.

19. The networked printer as claimed in claim 17, wherein said print message reference is a network address.

* * * * *